Jan. 23, 1951   R. W. BROWN   2,539,057
TOOL JOINT
Filed Sept. 2, 1944
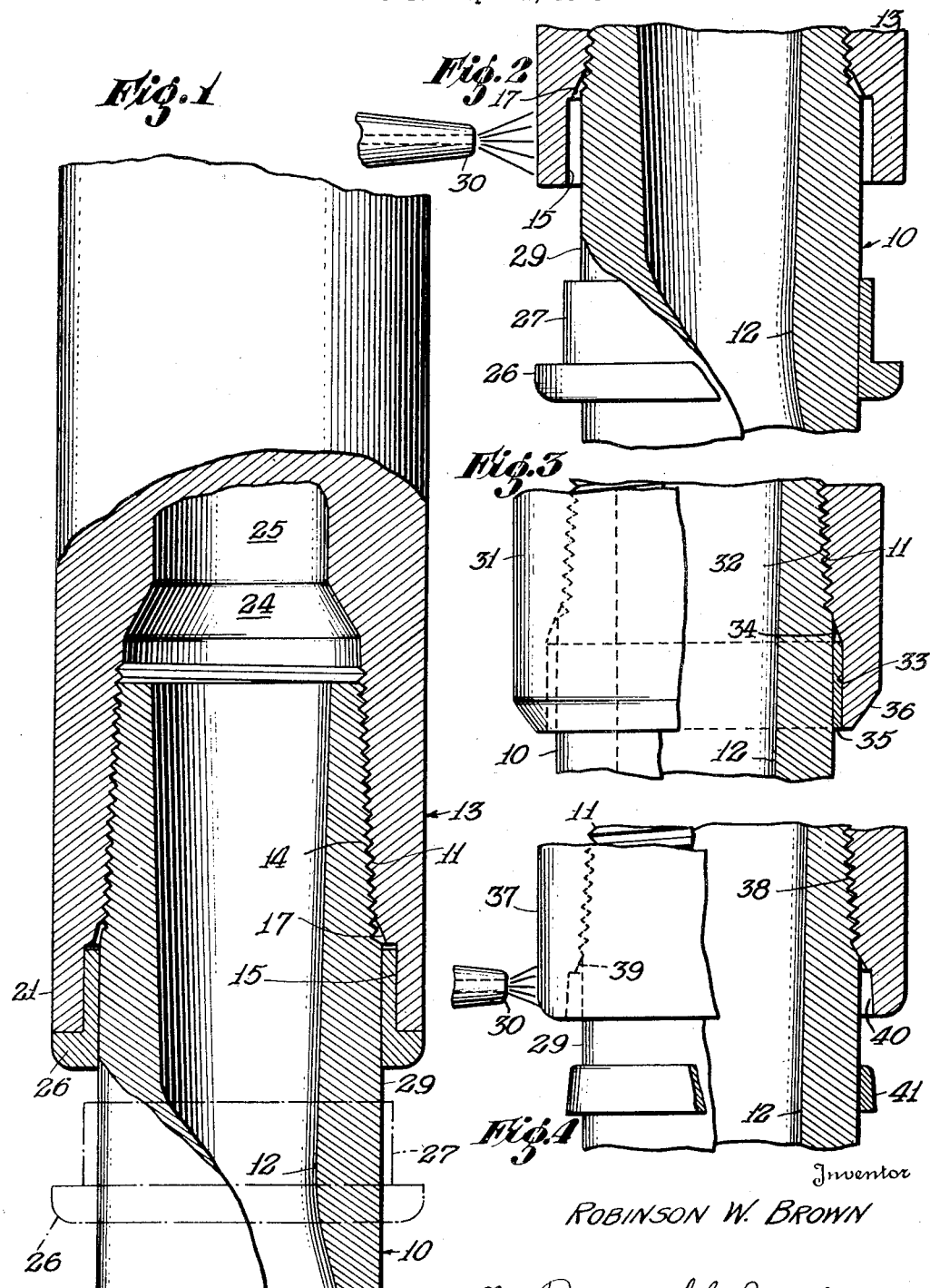
Inventor
ROBINSON W. BROWN
By Raymond G. Mullee
Attorney Patented Jan. 23, 1951

2,539,057

UNITED STATES PATENT OFFICE 2,539,057

TOOL JOINT

Robinson W. Brown, Oklahoma City, Okla., assignor to Chicago Pneumatic Tool Company, New York, N. Y., a corporation of New Jersey Application September 2, 1944, Serial No. 552,479

3 Claims. (Cl. 285—146)

This invention relates to a tool joint assembly for drill pipes, in which the joint member has an end portion contracted on a sealing and locking ring which is tightly fitted or clamped upon the associated drill pipe.

The main object of the invention is to provide a tool joint which may be assembled with a drill pipe in expeditious manner to couple the two securely in fluid tight condition without resorting to welding or use of very high temperatures.

Another object is to provide a strong tool joint with an undercut or counterbored end adapted to cooperate in shrink fit relation with at least a portion of a sealing and locking ring extending into the under-cut portion, while having the ring also tightly gripping the drill pipe, in order to produce a fluid tight coupling of great strength which is free from weak or strained spots which might cause failure in service.

A further object is to enable the joint member and associated drill pipe to be made up or screwed together under controlled torque prior to the insertion of the locking ring, and to prevent further make up, either during assembly or in service, after the ring has been fixed.

Other objects and the advantages of the invention will appear in fuller detail as the specification proceeds, when taken together with the accompanying drawing, in which:

Fig. 1 is an elevation of a tool joint assembled with a drill pipe according to certain features of the invention, the drill pipe being shown in fragmentary section and a portion of the joint being broken away to disclose details and relations of parts;

Fig. 2 illustrates a step of assembling the joint and pipe of Fig. 1;

Fig. 3 shows a modification of the tool joint and locking ring of said Fig. 1; and Fig. 4 depicts another modification and illustrates a step of assembling the same.

In conventional couplings or joints for drill pipes such as used in drilling oil wells and the like, experience has demonstrated that certain weaknesses appear to be inherent in the structures involved, as the assembled drill pipes frequently tend to fail in service in the vicinity of the last engaged thread upon the pipe. It has been sought to remedy this defect, and also to produce a fluid tight tool joint, by welding the parts after screwing the latter together to a proper make-up. However, such welding is a slow and costly process and necessitates considerable machine and torch work when such welded joints are worn out and require replacement.

In order to remedy the mentioned disadvantages and avoid welding, and particularly in view of the foregoing objects, the invention is designed to embody a tool joint adapted to be assembled with a drill pipe and an included sealing and locking ring by bringing the parts together conveniently without resorting to welding or use of very high temperatures.

Hence, referring again to the drawing, the drill pipe 10 is provided with a standard pipe thread 11 on the end thereof and internally with the upset portion 12. The hollow or tubular tool joint box 13 has a standard internal pipe thread 14 corresponding to thread 11 of the drill pipe, but between internal thread 14 and the end of the joint is a counterbore 15 connected with thread 14 by a chamfer or tapered portion 17 merging with said thread 14. Exteriorly the tool joint has along the major portion of its length a substantially uniform diameter terminating abruptly below at the lower end 21. The tool joint box element although shown cut off above is in general of conventional form and adapted to cooperate with a tool joint pin element (not shown).

Beyond the inner end of the mentioned thread 14 within the tool joint the relatively large internal diameter of the threaded portion is connected through the tapered or conical portion 24 to bore 25 of smaller diameter continuing up through box element 13.

As may be seen in Figs. 1 and 2, a sealing and locking ring 26 has a reduced portion 27 for engagement with counterbored portion 15 in the tool joint, the outside diameter of portion 27 being originally a few thousandths of an inch greater than the internal diameter of said portion 15. In assembling the joint and ring upon the drill pipe, the ring is preferably first slipped in upon pipe 10 to the preliminary general position, on a smooth cylindrical portion 29 of the pipe, as indicated in broken lines in Fig. 1. The tool joint 13 is then screwed on pipe 10 by means of a bucking-on machine under controlled torque up to a predetermined degree with threads 11 and 14 mutually engaging, after which the parts assembled thus far are mounted in a machine such as a lathe, and rotated about the longitudinal axis of the drill pipe and joint and a heating jet generally indicated at 30 directed at the lower end of the tool joint exteriorly of the counterbore and the latter portion thereby expanded to a sufficient diameter to permit insertion of the ring 26. At this juncture, the locking ring is shifted or slipped along pipe 10 to engage the reduced portion 27 thereof with the interior of the counterbore so as to fit within the latter as shown in Fig. 1. The counterbored portion 15 then contracts on cooling, and the ring portion 27, being relatively thin, gives in compression and is forced on to the smooth cylindrical portion 29 of pipe 10, the result being a shrink fit between the inside of the ring and pipe, and between the outside of the ring and the counterbore 15 in the tool joint 13.

In the final assembled position, the ring, which is exteriorly of the same diameter as the tool joint, actually forms a lower end or rear shoulder therefor and as the tool joint exerts considerable inward pressure on the ring and the latter is also rigidly clamped on the pipe the tool joint thoroughly seals and locks the ring on the pipe in rigid and fluid tight manner. At the same time the shrink fit between the tool joint, ring and pipe prevents further make-up in service and also prevents failure of the pipe at the last engaged thread. The latter is accomplished because the compressive stresses, caused by bucking-on of the joints, are carried over the last thread and distributed on to the heavy upset portion of the pipe. Bending stresses at the last engaged thread are also eliminated. In addition the ring forms the elevator shoulder by means of which the drill stem may be raised and lowered. For this reason it is desirable to make the ring 26 of a harder and more abrasion resistant material than that of the tool joint 13.

In Fig. 3 a modification is illustrated in which the drill pipe 10 is the same as before with its pipe thread 11 and internal upset portion 12, while the tool joint 31 has an internal pipe thread 32 similar to previous thread 14 and engaging pipe thread 11, the relatively deep counterbore 33 being connected by a tapered portion 34 with thread 32. In this form of the invention, the counterbored portion is shrink fitted on the relatively wide but thin locking ring 35 by heating said portion and especially the exteriorly beveled shoulder portion 36 as in the case of the counterbored portion 15 of the tool joint previously described.

While ring 35 has the advantage of simplicity of construction, it does not possess the function of an elevator shoulder, as in the case of ring 26. The Fig. 3 form of the invention is designed primarily for tool joint pins but is applicable also to boxes.

The gripping action of ring 26 or ring 35 may be increased by making the ring bore, in its initial condition, slightly less than the outside diameter of pipe 10. In this modified process, the first step is to heat the ring. The remaining steps of the process are the same as those previously described and occur while the ring remains warm and before it has an opportunity to shrink to its normal diameter. Upon final cooling, the ring is placed under a strain, within its elastic limit, resulting from its own expansion and partial contraction, as well as from the compressive force of the surrounding tool joint.

To accommodate the ring 26 or 35, the portion 29 of the pipe 10 adjoining threads 11 should be turned smooth and concentric with the pipe thread. This is the only special feature of construction of the pipe 10, which in all other respects may be a standard A. P. I. internal upset drill pipe. If desired, portion 20 could be upset slightly above the outside diameter of the pipe body. Moreover, the invention is also applicable to external upset, internal flush, drill pipe.

A further modification appears in Fig. 4, in which the drill pipe 10 again has a conventional pipe thread 11, internal upset 12 and smooth cylindrical surface 29 as before, while the tool joint 37 has an internal thread 38 engaging with thread 11, a chamber 39 and a recess 40 opening at the lower end of the tool joint. The recess 40 is shaped to fit the upwardly tapering peripheral surface of a ring 41. The ring is forced into the recess by pressure or by a hammering action and acts as an annular wedge between the joint 37 and pipe 10, whereby the ring is placed under radial compression as in the case of rings 26 and 35. If desired the force of compression can be increased by heating the ring or tool joint or both, as above described and then permitting the heated parts to contract upon the cylindrical surface 29 which surrounds the upset portion of the drill pipe.

When replacing joints, it is necessary only to cut off the old joints with a torch, clean the threads, replace the rings and install new joints.

What is claimed is:

1. In a connection between an externally threaded drill pipe and a tool joint member having complementary internal threads with a counterbore surrounding a cylindrical portion of the pipe; means for partially relieving stresses at the last engaged thread after such stresses have been established, said stress relieving means comprising a ring having a uniform cylindrical bore from end to end, the ring bore being slightly smaller than the cylindrical portion of the pipe and the ring periphery being slightly larger than the counterbore when the parts are in disassembled condition, the ring being expansible by heat treatment to permit it to be moved axially over the cylindrical portion of the pipe after the threads have attained their final engaged relation, the counterbore portion of the tool joint member being expansible upon heating to receive the ring and being contractible together with the ring about the cylindrical portion of the drill pipe whereby in the final condition to provide radial stress at the counterbore portion of the tool joint member and to cause the ring to grip the pipe in a fluid tight manner.

2. In a threaded connection, means for partially relieving stresses according to claim 1, in which the ring has a portion whose periphery is cylindrical to fit the counterbore, said portion terminating in a flange abutting the end of the tool joint member, the outside diameter of the flange being substantially the same as the outside diameter of the tool joint member.

3. In a threaded connection, means for partially relieving stresses according to claim 1, in which the counterbore and the periphery of the ring are tapered inwardly of the end of the tool joint.

ROBINSON W. BROWN.

REFERENCES CITED

The following references are of record in the file of this patent:

UNITED STATES PATENTS

| Number | Name | Date |
| --- | --- | --- |
| 362,205 | Converse | May 3, 1887 |
| 655,204 | Cushman | Aug. 7, 1900 |
| 854,936 | Dresser | May 28, 1907 |
| 1,849,339 | Vallendor | Mar. 15, 1932 |
| 2,181,343 | Reimschissel | Nov. 28, 1939 |
| 2,206,873 | Boynton | July 9, 1940 |

Certificate of Correction

Patent No. 2,539,057 January 23, 1951

ROBINSON W. BROWN

It is hereby certified that error appears in the printed specification of the above numbered patent requiring correction as follows:

Column 3, line 74, for "portion 20" read *portion 29*; column 4, line 8, for the word "chamber" read *chamfer*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*